Figure 1:
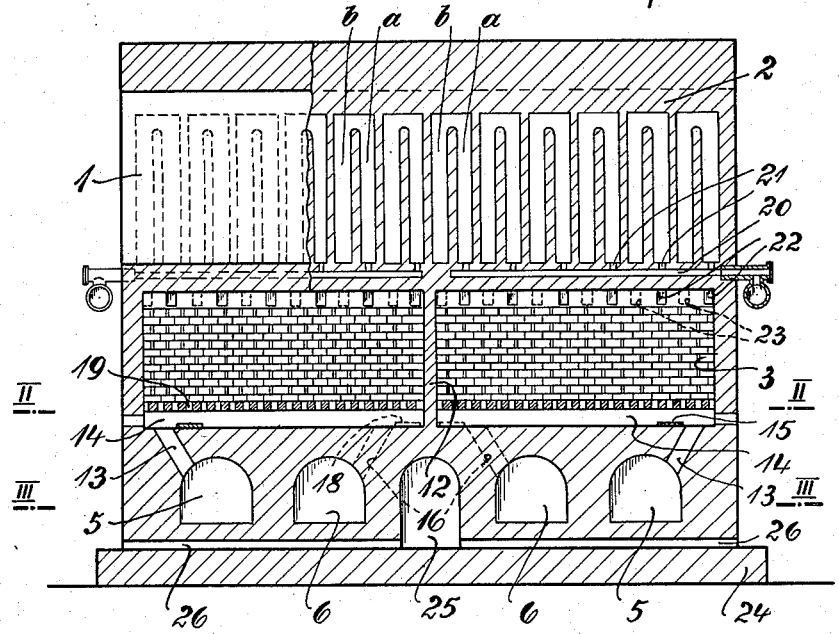

Jan. 8, 1935.  F. TOTZEK  1,986,904

REGENERATIVE COKE OVEN BATTERY

Filed April 8, 1931  2 Sheets-Sheet 1

Inventor:
Friedrich Totzek

Jan. 8, 1935.  F. TOTZEK  1,986,904
REGENERATIVE COKE OVEN BATTERY
Filed April 8, 1931   2 Sheets-Sheet 2

Inventor:
Friedrich Totzek
by Henry Lowe Clark
his atty

Patented Jan. 8, 1935

1,986,904

UNITED STATES PATENT OFFICE 1,986,904

REGENERATIVE COKE OVEN BATTERY

Friedrich Totzek, Essen-Stoppenberg, Germany, assignor, by mesne assignments, to The Koppers Company of Delaware, Pittsburgh, Pa., a corporation of Delaware Application April 8, 1931, Serial No. 528,697
In Germany April 10, 1930

6 Claims. (Cl. 202—143)

The present invention relates to a regenerative coke oven battery comprising a number of individual ovens wherein the direction of current alternates in twin heating flues or groups thereof, wherein the regenerators are disposed beneath the oven bottom in the longitudinal direction thereof so that functionally unitary regenerators extending over the lengths of the chamber preheat air or are flowed through by waste heat in continuous alternation.

It is already known in oven batteries of this type to supply the air to the regenerators from both face sides of the ovens, i. e., from the longitudinal sides of the battery, and to draw off the waste heat from the regenerators in the same manner towards both face sides of the ovens. This gave rise, however, to gas passages of unequal length in the oven system, because the outer pairs of heating flues of each heating wall lie nearer to the inlet or outlet end of the regenerators than the inner pairs of heating flues, and thereby cause unequal heating of the coke ovens.

The object of the invention is firstly to provide means whereby the inequality of the gas passages in the ovens and the consequent lack of uniformity in the heating of same may be avoided. The invention consists in disposing beneath the regenerators a series of waste heat flues, of which the outer are each connected at the outer end and the two inner in the middle to one of the regenerator bottom flues provided beneath the regenerators for distributing or collecting the media. In the same period of time, the two outer or the two inner waste heat channels are opened in the same way, so that they either draw off the waste heat to be exhausted or supply fresh combustion air to the regenerator.

The above arrangement may also be carried out when the functionally unitary regenerators extending over the chamber length are divided by a central transverse wall.

The invention also provides means whereby the length of the gas passages may be made equal in relation to the whole battery. For this purpose the channels running beneath the regenerators in the longitudinal direction of the oven battery and alternately carrying air and waste heat, are provided at both ends of the battery with slide valves, by means of which the inlets and outlets may be wholly or partially closed as required. These channels are all connected together at the end of the battery at which the waste heat is drawn off by means of a common transverse channel which leads to the chimney stack.

Finally the subject of the invention relates to the arrangement of cooling channels between the waste heat and air channels and the base of the battery. These cooling channels run from the two longitudinal sides of the battery and open in the middle into a common base flue which extends longitudinally beneath the whole battery of ovens and at the end of the battery at which the combustion air enters, is connected by means of a common transverse channel to the individual waste heat and air channels. By means of this arrangement of channels, the actual oven base is cooled from the heat radiated by the waste heat carrying channels.

The provision of cooling channels offers a great advantage in the coke furnace battery according to the invention in so far as no special suction apparatus need be provided to effect this cooling. On the contrary the cool air is simply switched into the path of the chimney draught, it being thus simultaneously supplied as preheated combustion air to the regenerators.

Figure 2:
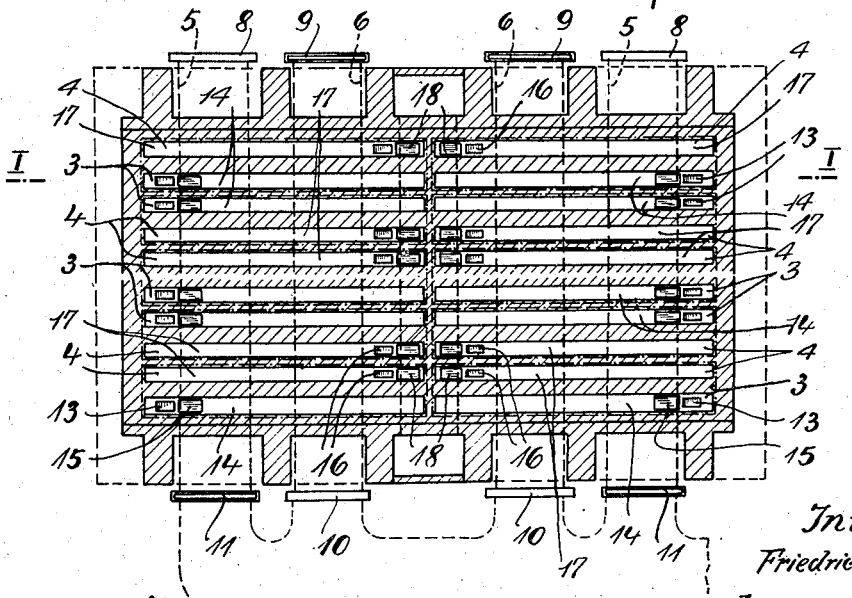
Figure 3:
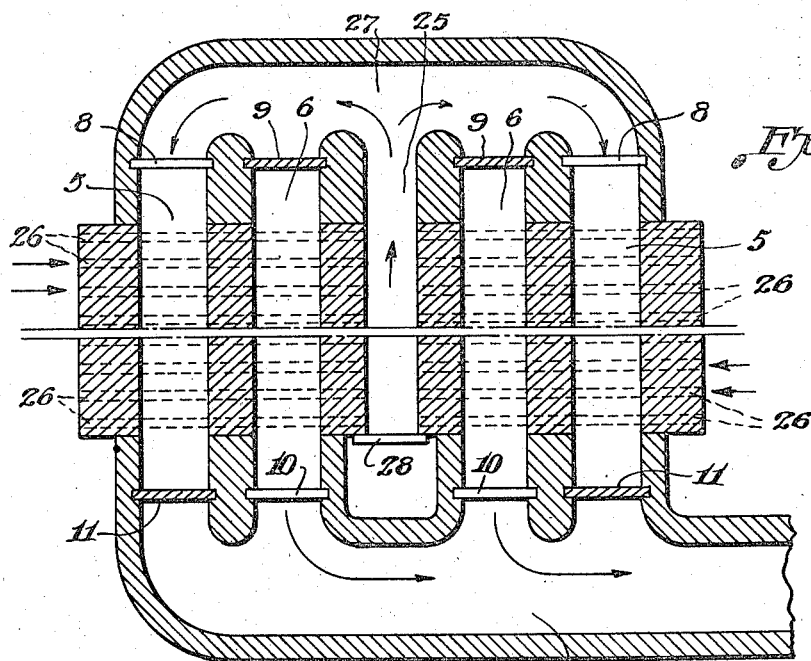
Figure 4:
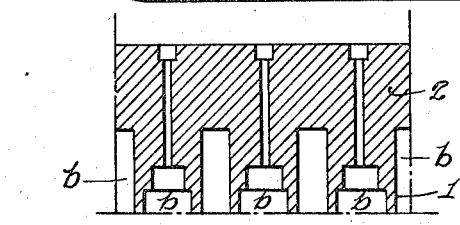
Figure 4:
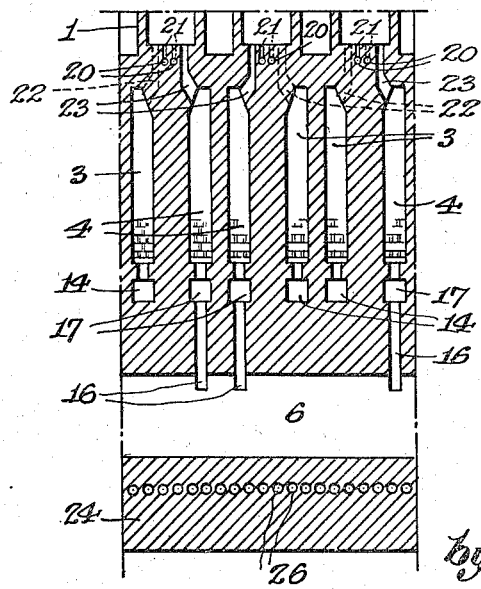

A preferred embodiment of the invention will now be described with reference to the accompanying drawings, in which, Fig. 1 is a vertical longitudinal section through the heating flues and regenerators, and the base flues of the oven battery according to the invention;

Fig. 2 is a horizontal cross-section through the regenerator bottom flues along the line II—II of Fig. 1, Fig. 3 is a horizontal cross-section through the base channels along the line III—III of Fig. 1, illustrating the arrangement of the cooling channels, and Fig. 4 is a vertical sectional view taken longitudinally of the battery.

The oven battery consists in known manner of the oven chambers 1 lying alternately contiguous to each other, and of heating walls 2 arranged in twin heating flues, in which the combustion gases rise in one vertical flue and descend in the adjacent one. Beneath the oven chambers are provided the functionally unitary regenerators 3 and 4 extending in the direction of the oven axis and lying contiguous to each other in the direction of the battery. Air and waste heat flow through these regenerators in alternate succession. The regenerators 3 or 4 may be divided in the middle by a transverse wall 12; this is without importance to the essence of the invention. Beneath these regenerators, are situated the channels 5 and 6 running in the direction of the battery axis and flowed through alternately by air and waste heat. These channels are connected at the end of the battery at which the waste heat is drawn off to a common transverse channel 7 which leads the waste heat to the chimney or the suction draught installation. The combustion air is always supplied from one end of the battery and the waste heat drawn off again from the other end. At the air inlet end of the battery the channels 5 and 6 are provided with valves 8 and 9 and at the waste heat outlet end, where the waste heat channels open into the common transverse channel 7, the valves 10 and 11 are disposed. The outer channels 5 on the one hand and the inner channels 6 on the other hand are continuously flowed through by the same media, that is, either air or waste heat. The outer channels 5 are connected by supply channels 13 to the regenerator bottom channels 14 of the regenerators 3, the cross section of these channels 13 being variable at will by valves 15. The inner channels 6 are connected by supply channels 16 to the adjacent bottom channel 17 of the renegerators 4, the cross section of the channels 16 being variable by valves 18 in the same manner. From the regenerators 3, channels 22 lead to the heating flues $a$ of the heating wall 2, whilst from the regenerators 4, channels 23 lead in the same manner to the heating draughts $b$ of the same heating wall 2. The manner in which the oven battery, according to the invention operates is as follows.

In one heating period the combustion air enters through the outer base channels 5 at one end of the battery through the opened valves 8, whilst the valves 11 of the channels 5 at the other end of the battery are closed. The valves 9 of the base channels 6 at the outlet end of the battery are then likewise closed, whilst the valves 10 of the channels 6 are open at the exhaust end of the battery. The combustion air then passes through the supply channels 13 from both longitudinal sides of the battery, through the bottom channels 14 and the distributing grid 19 into the regenerator compartments 3 and passes thence into the heating flues $a$ of the whole heating wall 2, where at the foot of same the combustion takes place with the gas supplied through conduits 20 and nozzles 21. The waste heat then passes through the heating flues $b$ of the heating walls 2 and through the channels 23 into the two regenerator compartments 4, where in flowing through the grid, it imparts heat to same, and after flowing through the distributing grids 19, and the regenerator bottom channels 17 is drawn through the inner supply channels 16 into the waste heat channels 6, to pass out from thence into the common transverse channel that is situated at one end of the battery, and from there to the chimney.

After about half hour alternation in the direction of the draught, the path of the gases is reversed accordingly. The combustion air then enters through the opened valves 9 of the inner channels 6, the valve 10 of same channel being closed at the waste heat end of the battery and the valves 11 of the outer channels 5 likewise situated at the waste heat end open the connection to the transverse channels 7 and the valves 8 of said channels 5 at the inlet end of the battery are closed.

The further construction of the oven battery according to the invention with the arrangement of cooling channels will now be described with reference to Fig. 3.

Between the oven base plate 24 and the waste heat or air channels 5 or 6 cooling channels 26 are provided leading from the longitudinal sides of the battery to a collecting channel 25 arranged in the middle axis of the battery, said channels being arranged at a certain distance from one another. In this arrangement, likewise, the waste heat or air channels 5 and 6 at the inlet end of the battery are connected by a common transverse channel 27, which is in turn connected to the collecting channel 25. The combustion air then passes from both the longitudinal sides of the battery through the channels 26 into the collecting channel 25, towards the outlet end of the oven battery and into the common transverse channel 27 and then passes in the same way as already described with reference to Figures 1 and 2 either through the outer channels 5, when valves 8 are open and valves 9 closed, or when valves 8 are closed and valves 9 open into the central air channels 6, the progress of heating being the same as already described.

In this manner therefore, the cooling air is continuously sucked in through the chimney draught according to the alternation of draught direction, and thus ensures an intensive cooling of the oven base. The quantity of combustion air thus supplied constantly can of course be supplemented by air supplied additionally, which is preferably introduced on the chimney side through the collecting channel 25 and controlled by a regulating valve 28.

The invention as hereinbefore set forth is embodied in a particular form of construction, but may be variously embodied within the scope of the claims hereinafter made.

I claim:—

1. In combination in a coke oven battery: a series of alternate coking chambers and heating walls therefor arranged side by side in a row, each of said heating walls comprising a row of vertical flame flues which are communicably connected at their upper ends with the upper ends of other vertical flues so as to provide two sets of vertical flues operable in alternation for inflow and outflow; a group of regenerators disposed transversely to the longitudinal axis of the battery from the sides to the middle of the battery and communicably connected to one of the sets of vertical flues; another group of regenerators disposed transversely to the longitudinal axis of the battery from the sides to the middle of the battery and communicably connected to the other set of vertical flues; a collecting channel at the bottom of and communicating with each of said regenerators; a series of at least four base flues disposed beneath the regenerators parallel to the longitudinal axis of the battery; two outer of said base flues being communicably connected with the collecting channels of the regenerators of one of the two groups thereof at substantially the outer sides of the battery only; and two inner of said base flues being communicably connected with the collecting channels of the regenerators of the other of the two groups thereof at substantially only the middle part of the battery.

2. In combination in a coke oven battery: a series of alternate coking chambers and heating walls therefor arranged side by side in a row, each of said heating walls comprising a row of vertical hairpin flame flues which are communicably connected together at their upper ends in pairs so as to provide two sets of vertical flues operable in alternation for inflow and outflow; a group of regenerators disposed transversely to the longitudinal axis of the battery from the sides to the middle of the battery and communicably connected to one of the sets of vertical flues; another group of regenerators disposed transversely to the longitudinal axis of the battery from the sides to the middle of the battery and communicably connected to the other set of vertical flues; a collecting channel at the bottom of and communicating with each of said regenerators; a series of at least four base flues disposed beneath the regenerators parallel to the longitudinal axis of the battery; two outer of said base flues being communicably connected with the collecting channels of the regenerators of one of the two groups thereof at substantially the outer sides of the battery only; and two inner of said base flues being communicably connected with the collecting channels of the regenerators of the other of the two groups thereof at substantially only the middle part of the battery; and control valves adjustable from the collecting channels and disposed on the mouths of the connecting channels between the base flues and the regenerator collecting channels.

3. In combination in a coke oven battery: a series of alternate coking chambers and heating walls therefor arranged side by side in a row, each of said heating walls comprising a row of vertical hairpin flame flues; a continuous partition wall disposed beneath said series in the middle of the battery parallel to the longitudinal axis of the same; two groups of regenerators operable for concurrent inflow and outflow in alternation with each other, regenerators of each group extending from said partition wall to the side of the battery on each side of said wall and communicating with said vertical flues; base flues operable in alternation with each other for concurrent inflow and outflow disposed lengthwise of said battery; one of said base flues communicating with the regenerators of one of said groups thereof substantially only at the region of the aforesaid partition wall and others of said base flues that are operable for concurrent flow in reverse direction communicating with the regenerators of the other group thereof substantially only at the outer sides of the battery.

4. In combination in a coke oven battery: a series of alternate coking chambers and heating walls therefor arranged side by side in a row, each of said heating walls comprising a row of vertical hairpin flame flues; two groups of regenerators operable for concurrent inflow and outflow in alternation with each other, regenerators of each group extending from the two opposite sides of the battery to the longitudinal middle thereof and communicating with said vertical flues; base flues operable in alternation with each other for concurrent inflow and outflow and extending lengthwise of said battery; one of said base flues communicating with regenerators of one of said groups thereof substantially only at the middle part of the battery and others of said base flues that are operable for concurrent flow in reverse direction communicating with the regenerators of the other group thereof substantially only at the outer sides of the battery.

5. In combination in a coke oven battery: a series of alternate coking chambers and heating walls therefor arranged side by side in a row, each of said heating walls comprising vertical hairpin flame flues communicably connected together at their upper ends in pairs so as to provide two sets of heating flues operable for inflow and outflow in alternation; a continuous partition wall disposed beneath said series in the middle of the battery parallel to the longitudinal axis of the same; two groups of regenerators operable for concurrent inflow and outflow in alternation with each other, regenerators of each group extending from said partition wall to the sides of the battery on each side of said wall and communicating with said sets of vertical flues; two outer and two inner base flues beneath said regenerators and extending lengthwise of the battery; means communicably connecting the outer base flues with the regenerators of one of said groups substantially only at the outer ends thereof; and means communicably connecting the inner base flues with the regenerators of the other group thereof substantially only at the middle part of the battery, the connecting means for one inner base flue opening at the foot of said partition wall on one side thereof and the connecting means for the other inner base flue opening similarly on the opposite side of said wall.

6. In combination in a coke oven battery: a series of alternate coking chambers and heating walls therefor arranged side by side in a row, each of said heating walls comprising a row of vertical hairpin flame flues which are communicably connected at their upper ends with the upper ends of other vertical flues so as to provide two sets of vertical flues operable in alternation for inflow and outflow; a group of regenerators disposed transversely to the longitudinal axis of the battery from the sides to the middle of the battery and communicably connected to one of the sets of vertical flues; another group of regenerators disposed transversely to the longitudinal axis of the battery from the sides to the middle of the battery and communicably connected to the other set of vertical flues; a collecting channel at the bottom of and communicating with each of said regenerators; a series of at least four base flues disposed beneath the regenerators parallel to the longitudinal axis of the battery; two outer of said base flues being communicably connected with the collecting channels of the regenerators of one of the two groups thereof at substantially the outer sides of the battery only; and two inner of said base flues being communicably connected with the collecting channels of the regenerators of the other of the two groups thereof at substantially only the middle part of the battery; chimney flue gas collecting means adapted to communicate with all of said base flues at one and the same end of the battery only for drawing of waste gas at one end of the battery only; and air supply means adapted to communicate with said base flues at the opposite end of the battery only for supplying air at said opposite end only.

FRIEDRICH TOTZEK.